Figure 1:
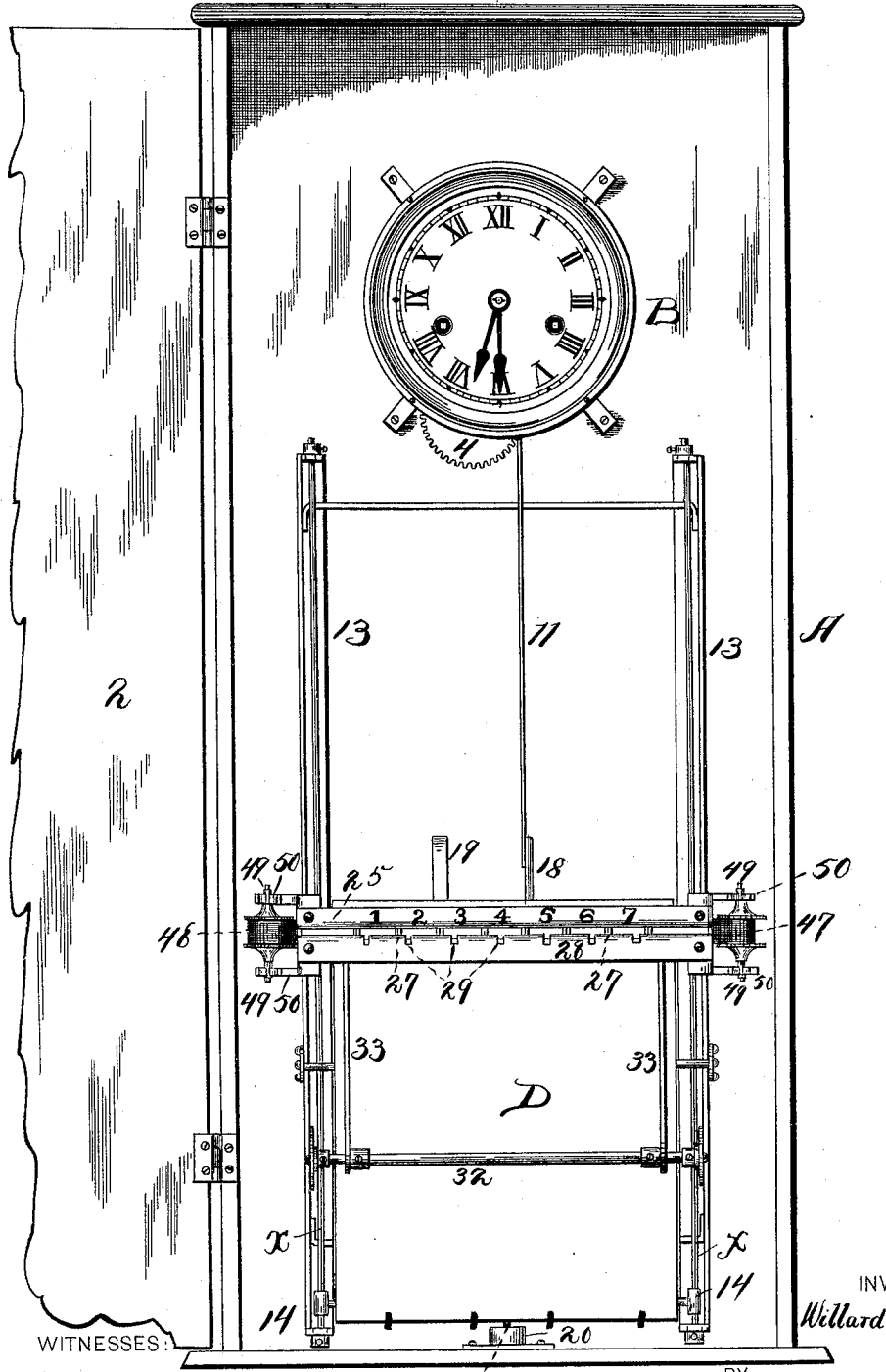

(No Model.) 6 Sheets—Sheet 1.

W. LE G. BUNDY.
WORKMAN'S TIME RECORDER.

No. 605,159. Patented June 7, 1898.

WITNESSES:
Charles W. Morvin
Jessie E. Murray

INVENTOR
Willard L. Bundy.

BY
Smith & Denison
ATTORNEYS.

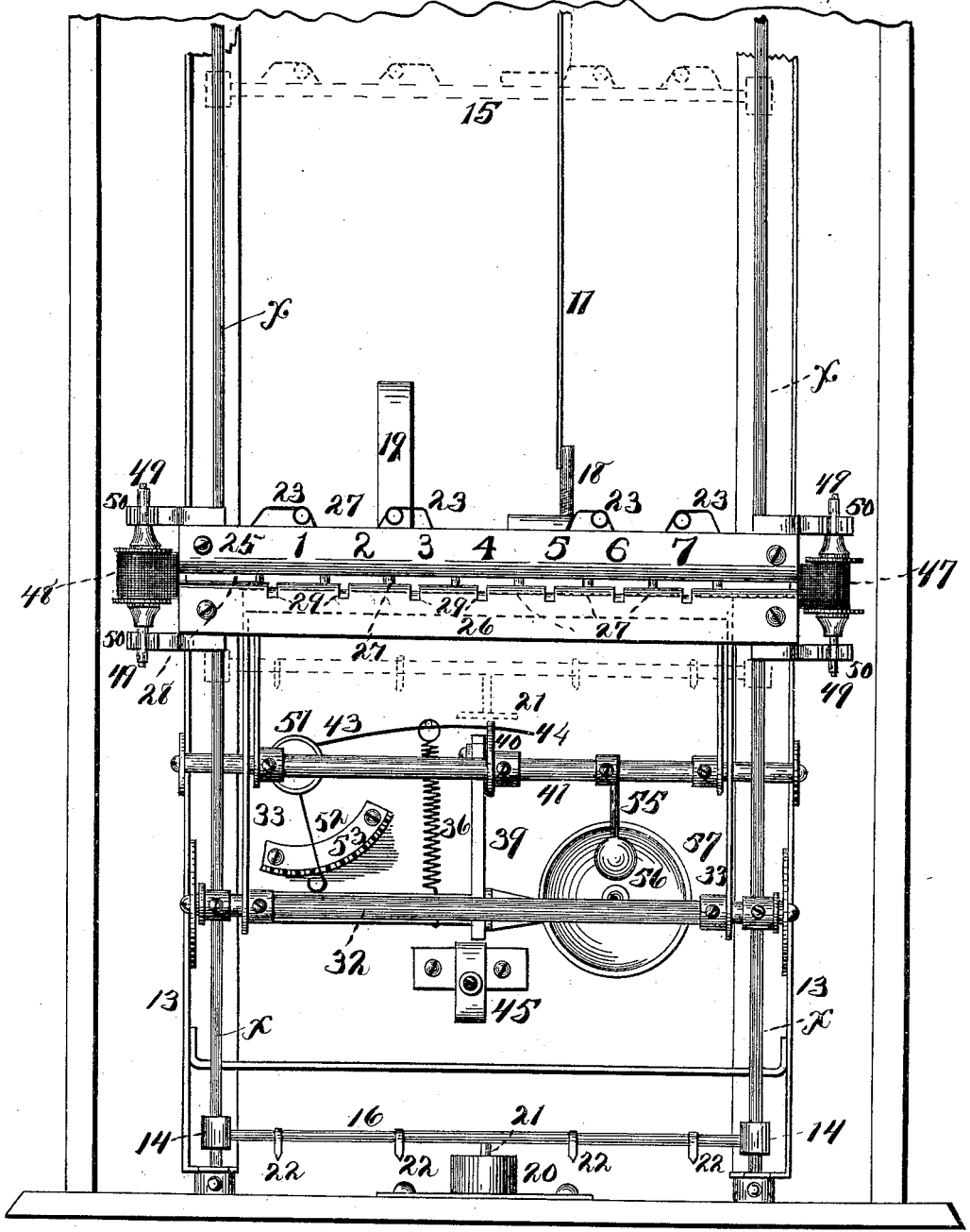

(No Model.) 6 Sheets—Sheet 3.
W. LE G. BUNDY.
WORKMAN'S TIME RECORDER.
No. 605,159. Patented June 7, 1898.
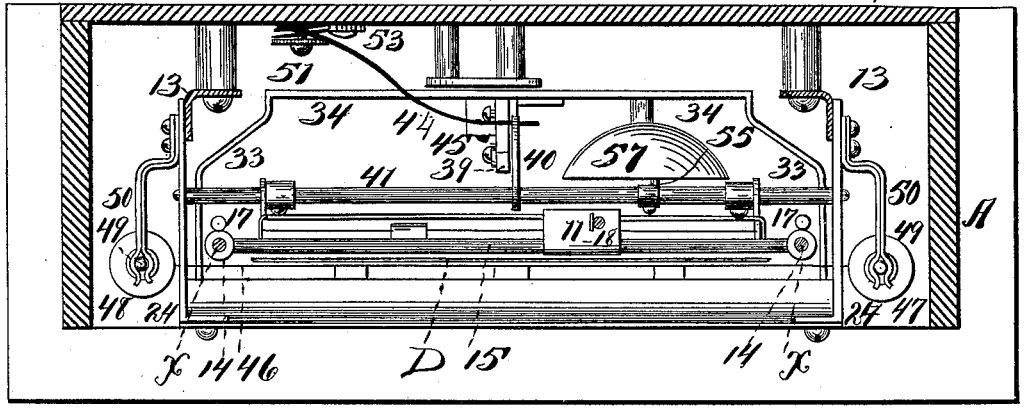
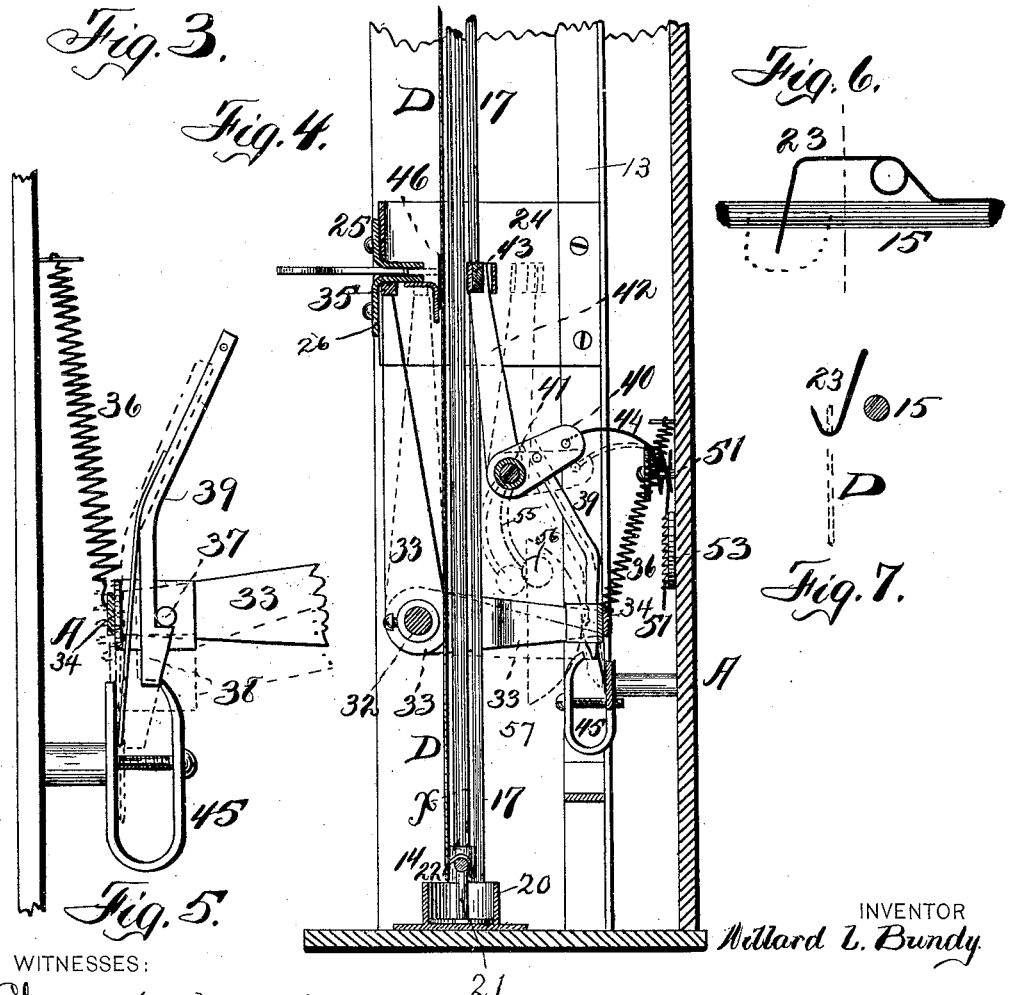
WITNESSES:
Charles W. Marvin,
Jesse E. Murray.
INVENTOR
Willard L. Bundy.
BY
Smith & Denison
ATTORNEYS.

(No Model.) 6 Sheets—Sheet 4.
W. LE G. BUNDY.
WORKMAN'S TIME RECORDER.
No. 605,159. Patented June 7, 1898.
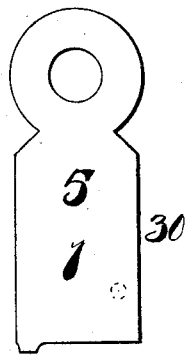
Fig. 8.
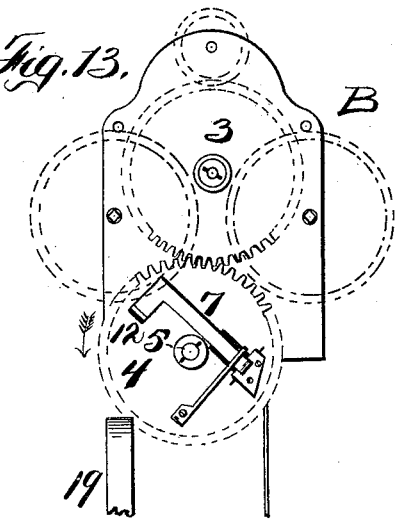
Fig. 13.
Fig. 9.
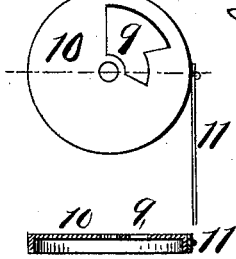
Fig. 16.
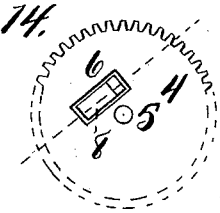
Fig. 14.
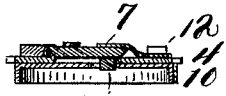
Fig. 10.
Fig. 15.
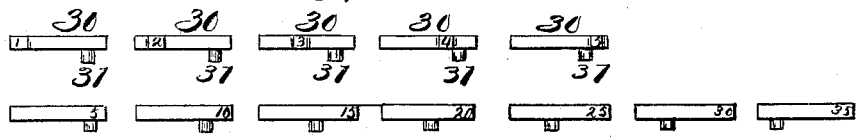
Fig. 17.   Fig. 11.
Fig. 12.
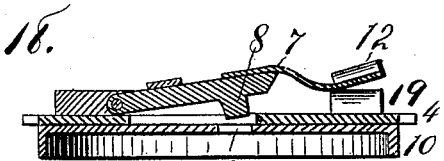
Fig. 18.
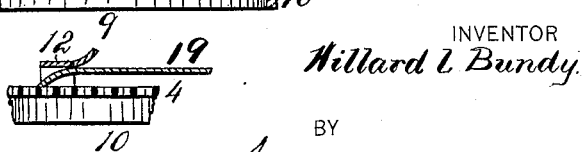
Fig. 19.
WITNESSES:
Charles W. Morin
Jessie E. Murray
INVENTOR
Willard L Bundy.
BY
Smith & Denison
ATTORNEYS.

(No Model.) 6 Sheets—Sheet 5.

W. LE G. BUNDY.
WORKMAN'S TIME RECORDER.

No. 605,159. Patented June 7, 1898.

Fig. 20

INVENTOR
Willard L. Bundy.

WITNESSES:
Charles W. Morris.
Jesse E. Murray.

BY
Smith Thompson
ATTORNEYS.

(No Model.) 6 Sheets—Sheet 6.
W. LE G. BUNDY.
WORKMAN'S TIME RECORDER.
No. 605,159. Patented June 7, 1898.
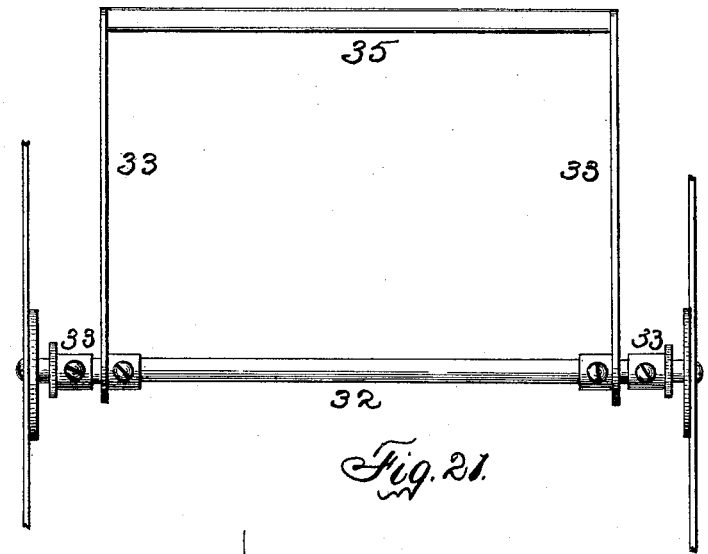
Fig. 21.
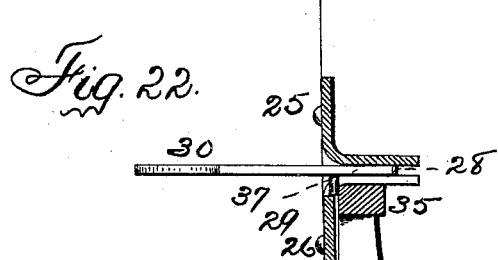
Fig. 22.
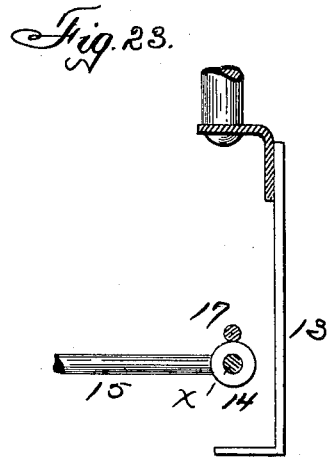
Fig. 23.
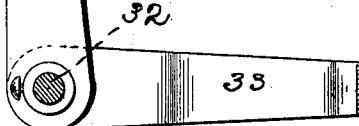
WITNESSES:
Charles W. Morrin.
Mary A. Franklin.
INVENTOR
Willard L. Bundy
BY
Smith & Denison
his ATTORNEYS.

United States Patent Office.

WILLARD LE GRAND BUNDY, OF BINGHAMTON, NEW YORK.

WORKMAN'S TIME-RECORDER.

SPECIFICATION forming part of Letters Patent No. 605,159, dated June 7, 1898.

Application filed December 9, 1895. Serial No. 571,455. (No model.)

*To all whom it may concern:*

Be it known that I, WILLARD LE GRAND BUNDY, of Binghamton, in the county of Broome, in the State of New York, have invented new and useful Improvements in Workmen's Time-Recorders, of which the following, taken in connection with the accompanying drawings, is a full, clear, and exact description.

My invention relates to workman's time-recorders; and my object is to provide a novel mechanism by which each workman mechanically records the time of his entrance or departure upon a flat sheet of paper by the single act of inserting a key bearing the numeral by which the workman is known or designated and thereby actuating a mechanism whereby said numeral is imprinted upon the paper, which is provided with graduated spaces in such manner that the time is shown by the location of the printed numeral, in which means are provided by which said sheet of paper is raised gradually, so that its graduations are synchronous with the clock-movement to which said sheet is connected to actuate the winding mechanism by which the sheet is raised, means being provided by which the winding mechanism is tipped at a fixed and predetermined time and said sheet automatically, as by gravity, is carried back or returned to its starting-point, the sheet being mounted upon a suitable frame provided with suitable means whereby it is kept stretched taut and free from wrinkles and prevented from sagging, in which an alarm mechanism is actuated by the act of the insertion of the key, first, to swing the bell from its normal position into the proper position to sound the alarm, and, secondly, to sound the alarm when the bell reaches the proper point simultaneous with the act of printing the workman's numeral from the key and making the record.

A pair of parallel horizontal plates are secured upon the frame, the space between them being divided into a series of separate keyhole-compartments by vertical partitions, and the keys are divided into sets, so that each keyhole has its separate set and can only receive the several keys of its set of keys, each key of a set having a guide-pin on its side and having its numeral in a fixed position, so that if there are five keys in a set and they are operated consecutively or in any other manner their numerals will be printed upon the paper, each within a fixed space upon the paper, and the keys of different sets having their guide-pins in different relative positions from those of any other set, so that a key belonging to one set cannot be inserted into any other compartment than the one where it belongs.

Means are also provided whereby the force of the impression-blow can be varied as may be desired, and a suitable ink-ribbon being interposed between the end of the key and the paper, the impression-blow being made against the back of the paper to drive it and the ribbon against the numeral upon the inserted key to make the imprint therefrom onto the paper.

My invention consists in the several novel features of construction and operation, which are hereinafter described, and which are specifically set forth in the claims hereunto annexed.

It is constructed as follows, reference being had to the accompanying drawings, in which—

Figure 1 is a front elevation of the machine complete with the door swung open. Fig. 2 is an enlarged front elevation of the same, omitting the clockwork. Fig. 3 is a transverse sectional elevation of Fig. 2. Fig. 4 is a vertical sectional elevation of the same. Fig. 5 is an enlarged detail of the trip which releases the impression mechanism to strike an impression-blow. Fig. 6 is a detail in front elevation of one of the paper hooks and stretchers and its mounting. Fig. 7 is a section thereof on the dotted line in Fig. 6. Fig. 8 is a front elevation of a key. Fig. 9 is a rear elevation thereof. Fig. 10 is an elevation of the end of the key and the numeral thereon. Fig. 11 is an end elevation of a set of five keys, showing the spacing or arrangement of the numerals thereon. Fig. 12 is an end elevation of the fifth key of each of seven sets of keys and the numerals thereon. Fig. 13 is a front elevation of the clock-movement, gear on hour-hand shaft, winding gear and drum, trip mechanism detachably connecting the winding-gear to the drum, part of the tripper and lifting-cord, shown partly in full and partly in dotted lines. Fig. 14 is a rear elevation of the winding gear and drum. Fig. 15 is a transverse section thereof upon the dotted line in Fig. 14. Fig. 16 is a front elevation of the winding-drum. Fig. 17 is a section thereof on the dotted line in Fig. 16. Fig. 18 is an enlarged section of the winding gear and drum and showing the tripping mechanism operated to release the drum from said gear. Fig. 19 is an enlarged detail of tripper in engagement with the trip, as in Fig. 18. Fig. 20 is a plan view of a record-sheet having some records printed thereon, showing when the respective workmen entered and departed during the forenoon and afternoon. Fig. 21 is a front elevation of the key-bar, bell-crank, and rock-shaft detached. Fig. 22 is a sectional detail of the numeral and key-guide bars, key-bar, bell-crank, and rock-shaft, and also showing a key partly inserted. Fig. 23 is a horizontal sectional detail of the relative positions of the guide-rod $x$ and the bar 13.

A is a suitable casing, having a door 2.

B is a suitable clock mechanism in which the hour-hand arbor is driven in the usual way to drive a gear 3 thereon, which drives a winding-gear 4, journaled upon a suitable arbor 5. This gear is provided with a suitable opening 6. A spring-actuated trip-dog 7 is hinged or otherwise suitably mounted upon said gear and provided with a stud 8, adapted to pass through said opening 6 and enter an opening 9 in the end of a drum 10, and thus connect said gear to said drum to rotate it upon said arbor 5 when the opening 6 is brought into position to coincide with said opening 9. This rotation of the drum will wind up the cord, chain, or band 11. The free end of said trip-pawl has an outwardly bent or beveled arm 12.

Parallel uprights 13 (shown as angular in cross-section) are erected upon the base of the case. Standards $x$ or parallel guides are suitably erected in or upon the steps shown upon the base and in front of the uprights 13, upon which guides the sleeves 14 are mounted free to traverse them vertically and connected horizontally by cross-bars 15 16, and these cross-bars are vertically connected by suitable rods 17, Fig. 3, thereby creating the paper-frame, to which the cord 11 is suitably connected, as to an arm 18 upon the upper cross-bar, so that by the clock-driven gearing the drum is rotated to wind up said cord and raise said frame synchronously with the time of the clock until the beveled tripper 19 engages with the arm 12, Figs. 18 and 19, forces said stud out of engagement with said drum, and releases it, so that said frame will fall to the starting-point, unwinding said cord.

To prevent undue concussion, an air-chamber 20 is mounted upon the case and, with a suitable piston 21, creates an air-cushion; but many other suitable means for the purpose will readily suggest themselves to any good mechanic to take up the concussion without rebound to affect the clock.

Upon the cross-bar 16 suitable hooks 22 are secured, and upon the bar 15 the spring-hooks 23 are secured in such manner that by their spring action the paper record-sheet D, mounted upon both sets of hooks, is always kept taut, smooth, flat, and free from wrinkles. This record-sheet is graduated in any suitable manner, as by vertical and horizontal lines, creating at the left the vertical row of spaces $a$, in which the time-numerals are printed, each of which is in alinement with a row of horizontal spaces $b$, which for greater convenience are divided up by verticals $c$, each subspace or compartment being here shown as adapted to receive the numerals of five workmen according to the row of consecutive numerals across the top of the sheet. This is a very convenient arrangement, but not an arbitrary one, as it is evident that it can be changed or varied in many ways, although it would undoubtedly be advisable to retain the row of workmen's numerals in or upon the margin and also to have spaces at the bottom in which to enter the total time of each workman for the day.

Upon suitable brackets 24, secured to the uprights 13, a numeral-bar 25 and a key-guide bar 26 are secured, the bar 25 having numerals corresponding to the vertical rows of spaces upon the record-sheet, each representing the numerals of five (or a set of) workmen, and the partitions 27 divide the slot 28 into compartments, designated by the numerals upon said bar, said partitions also serving as guides for the edges of the keys. The upper edge of the bar 26 is provided with notches 29, each spaced at a different distance from the left-hand partition of each compartment. The keys 30 consists of a flat piece of suitable metal, each having a workman's numeral upon its inner end, and said numerals are spaced at different distances from the left-hand edge, substantially as shown, so that five keys, Fig. 11, constitute a set, and each key of a set has a stud 31 located at the same distance from either edge, and, as shown in Fig. 12, the seven sets each have a like stud $m$ located at different distances from the left edge corresponding to the notches 29, so that a key of one set cannot be inserted into any other compartment than that of its set. The key shown in Figs. 8, 9, and 10 is marked to show that it represents the fifth key of set No. 1 or workman No. 5, and this key can only enter the compartment No. 1.

A rock-shaft 32 is journaled in suitable brackets secured to the uprights. Bell-crank levers 33 are secured thereto and rearwardly connected by a bar 34, while the upper ends are connected by the key-bar 35, the upper edge of which projects high enough to partly fill the key-stud notches 29, and 36 is a spring which operates to hold these parts in their normal positions, being connected to the case and to the bar 34. When a key is inserted, its stud forces the bar 35 back, rocks said shafts, depresses the rear ends of the bell-cranks and bar 34, and by the engagement of the stud 37 on the horizontal arm of the bell-crank 33 with the head 38 on the draw-bar 39 the crank-arm 40, connected to said draw-bar, is swung, which rocks the shaft 41, throws the arms 42 and the impression-bar 43, which is carried by said arms, away from the back of the paper sheet, producing a tension upon the impression-spring 44. Upon a suitable upright, Fig. 4, a platen-trip 45 is secured in such position that as the draw-bar 39 is pulled down its head will engage with said trip and be wedged out of engagement with said stud, and thus release the impression-platen to strike an impression-blow against the back of the paper and force it and the ink-ribbon 46 against the numeral upon the end of the key. This ribbon extends across the sheet upon the printing-line from one spool, 47, to the other, 48. These spools are provided with arbors 49, which are gripped between the spring-jaws 50, which are mounted upon the uprights and are here shown as adapted to be rotated by hand to feed the ribbon longitudinally and also as movable vertically to vary the line of the impression-blow upon the ribbon.

The platen-spring 44 has one arm in engagement with the crank-arm 40, is centrally coiled around a suitable post 51 upon the casing, and its other end 52 is in detachable engagement with the rack-bar 53, so that by shifting this end the tension of the spring will be varied, and thus the strength of the impression-blow will be regulated as may be desired.

An arm 55, secured upon the rock-shaft 41, carries the bell-hammer 56. The bell 57 is mounted upon the bar 34 and is normally out of the alarm-sounding position or stroke of the hammer; but when the bar 34 is depressed by the act of the insertion of a key the bell is thereby swung into proper position to receive the hammer-blow. The result of this is that a workman cannot sound the alarm by the partial insertion of his key, but must fully insert it to make a record and an alarm together.

It will thus be seen that the principle of my invention is the recording of workmen's designating-numerals upon a flat sheet of paper by an impression mechanism actuated by the insertion of a key provided with a workman's designating-numeral, said record-sheet being mounted upon a vertically-reciprocated frame connected to and adapted to be raised synchronously with a clock-movement, so that the numeral-records of the respective workmen are in vertical columns and their time-records are in horizontal lines, means being provided whereby the sheet-holding frame is tripped at a predetermined time and by gravity returns to its normal starting-point, means being also provided whereby the record cannot be made without the giving of an alarm, the bell being mounted upon a vibratory frame actuated by the insertion of a key to swing the bell into position to receive the blow of the hammer substantially simultaneous with the making of the record imprint from the key-numeral.

Having described my invention, what I claim, and desire to secure by Letters Patent, is—

1. In a workman's time-recorder, the combination with a case, a horizontal bar across it provided with a multiple series of separate keyholes, a clock mechanism, a flat record-sheet suspended therefrom and raised by it, an ink-ribbon in the plane of said keyholes and in front of said sheet, of an impression-frame consisting of a rock-shaft transverse to said case, arms thereon, an impression-platen upon said arms, in rear of said record-sheet, and common to all of said keyholes whereby it is actuated to strike an impression-blow by the insertion of a workman's designating-key into any keyhole and print the numeral of the key onto that part of the moving record-strip, which is opposite the keyhole used.

2. In a workman's time-recorder, a record-sheet and a rectangular frame having a series of spring-hooks upon its cross-bars whereby said sheet is mounted upon said frame and held taut, flat and smooth by the spring tension of said hooks in combination with a suitable drum to which said frame is connected and means to rotate said drum and thereby raise said frame and sheet.

3. In a workman's time-recorder, a vertically-movable frame, a record-sheet removably mounted thereon, a clock-movement, a drum rotated thereby, a cord connecting said drum to said frame, and means to trip said drum at a predetermined time and permit said frame to return to its starting-point, in combination with a vibratory platen of a length equal to the width of the sheet, actuated by the manual thrust of a key inserted into a keyhole in alinement with said platen to strike a blow upon and print the workman's designating-numeral of said key onto said sheet.

4. In a workman's time-recorder, a flat record-sheet vertically movable, and parallel bars and connecting-partitions creating a series of keyholes extending the entire width of the sheet, in combination with a bell-hammer actuated to strike a blow by the insertion of a key into any one of said keyholes, and a bell normally out of the path of said hammer and mounted upon a swinging frame by which it is brought into position to receive the hammer-blow, by the insertion of said key.

5. In a workman's time-recorder, the combination with a rock-shaft having crank-arms upon its ends and an impression-platen mounted upon said shaft, of a parallel rock-shaft, bell-cranks upon its ends, the rearward arms of which are suitably connected to said crank-arms and having their vertical arms connected by a key-bar parallel with the face of the platen, whereby when a key is inserted into a keyhole it swings said key-bar and platen in parallelism.

6. In a workman's time-recorder, a flat record-sheet, an ink-ribbon transverse thereto, a horizontal key-bar across the front of said sheet and ribbon and parallel therewith, combined with an impression-platen across the rear of said sheet and ribbon, and parallel with them and with said key-bar, and means to connect said key-bar, and platen whereby the insertion of a key into a keyhole will actuate said key-bar to vibrate said platen to strike an impression-blow against said sheet to imprint the numeral of the inserted key upon said sheet.

In witness whereof I have hereunto set my hand on this 4th day of December, 1895.

WILLARD LE GRAND BUNDY.

In presence of—
   ALEX. CUMMING,
   A. W. CUMMING.